US005671373A

United States Patent [19]

Prouty et al.

[11] Patent Number: 5,671,373

[45] Date of Patent: Sep. 23, 1997

[54] DATA BUS PROTOCOL FOR COMPUTER GRAPHICS SYSTEM

[75] Inventors: Bryan G. Prouty, Wellington; Eric M. Rentschler, Fort Collins, both of Colo.

[73] Assignee: Hewlett-Packard Company, Palo Alto, Calif.

[21] Appl. No.: 480,607

[22] Filed: Jun. 8, 1995

[51] Int. Cl.[6] .................... G06F 13/38

[52] U.S. Cl. .................... 395/307; 395/310; 395/850

[58] Field of Search .................... 395/307, 850, 395/119, 122, 162, 164, 309, 310

[56] References Cited

U.S. PATENT DOCUMENTS

| | | | |
|---|---|---|---|
| 4,447,878 | 5/1984 | Kinnie et al. | 395/307 |
| 4,525,804 | 7/1985 | Mosier et al. | 395/250 |
| 4,716,527 | 12/1987 | Graciotti | 395/307 |
| 5,113,369 | 5/1992 | Kinoshita | 395/307 |
| 5,280,598 | 1/1994 | Osaki et al. | 395/307 |
| 5,394,528 | 2/1995 | Kobayashi et al. | 395/307 |
| 5,423,009 | 6/1995 | Zhu | 395/307 |

FOREIGN PATENT DOCUMENTS

| | | | |
|---|---|---|---|
| 2234093 | 1/1991 | United Kingdom | G06F 3/06 |
| 2234098 | 1/1991 | United Kingdom | G06F 13/38 |
| 2280765 | 2/1995 | United Kingdom | G06F 13/40 |
| 2264574 | 10/1995 | United Kingdom | G06F 3/06 |

*Primary Examiner*—Glenn A. Auve

[57] ABSTRACT

An apparatus and method for transferring data between first and second circuit blocks of a computer graphics system are provided. The first and second circuit blocks are interconnected by a data bus having n bits. The apparatus includes a circuit in the first circuit block for sequentially transmitting data words from the first circuit block to a second circuit block on the data bus. The data words include one or more long data words having more than n bits. The apparatus further includes a register in the first circuit block for storing bits of the long data words in excess of n bits, and a controller in the first circuit block for loading the bits of the long data words in excess of n bits into the register and for combining the bits of the long data words stored in the register into a composite data word for transmission to the second circuit block. The composite data word may include a short data word having less than n bits. In a preferred embodiment, Z coordinate data words having 40 bits are transmitted with an 8 bit command word over a 32 bit data bus without extra bus cycles.

18 Claims, 6 Drawing Sheets

| Word Name | Number of Bits | Function of Word |
|---|---|---|
| X Start edge 1 | 32 | Defines X at start of edge 1 |
| Y Start edge 1 | 32 | Defines Y at start of edge 1 |
| dX/dY edge 1 | 32 | Change in X along edge 1 |
| Y Stop edge 1 | 32 | Defines Y at stop of edge 1 |
| X Start edge 2 | 32 | Defines X at start of edge 1 |
| dX/dY edge 2 | 32 | Change in X along edge 2 |
| X Start edge 3 | 32 | Defines X at start of edge 3 |
| Y Start edge 3 | 32 | Defines Y at start of edge 3 |
| dX/dY edge 3 | 32 | Change in X along edge 3 |
| R Start edge 1 | 32 | Defines R at start of edge 1 |
| G Start edge 1 | 32 | Defines G at start of edge 1 |
| B Start edge 1 | 32 | Defines B at start of edge 1 |
| dR/de | 32 | Change in R along edge 1 |
| dG/de | 32 | Change in G along edge 1 |
| dB/de | 32 | Change in B along edge 1 |
| dR/dX | 32 | Change in R in X direction |
| dG/dX | 32 | Change in G in X direction |
| dB/dX | 32 | Change in B in X direction |
| Z | 40 | Defines Z at start of edge 1 |
| dZ/de | 40 | Change in Z along edge 1 |
| dZ/dX | 40 | Change in X along edge 1 |
| Start Command | 8 | Defines how to draw triangle |

FIG 3

DATA BUS PROTOCOL FOR COMPUTER GRAPHICS SYSTEM

BACKGROUND OF THE INVENTION

1. Field of the Invention

The present invention relates generally to computer graphics systems, and more particularly, to a bus protocol for transferring Z coordinate data over a data bus in a computer graphics system.

2. Discussion of the Related Art

Computer graphics systems commonly are used for displaying graphical representations of objects on a two dimensional display screen. Current computer graphics systems can provide highly detailed representations and are used in a variety of applications.

In typical computer graphics systems, an object to be represented on the display screen is broken down into a plurality of graphics primitives. Primitives are basic components of a graphics picture and may include points, lines, vectors and polygons, such as triangles. Typically, a hardware/software scheme is implemented to render, or draw, on the two-dimensional display screen, the graphics primitives that represent the view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the X,Y,Z coordinates of its vertices, as well as the R,G,B color values of each vertex. Rendering hardware interpolates the primitive data to compute the display screen pixels that are turned on to represent each primitive, and the R,G,B values for each pixel.

Typically, the primitive data is distributed between various circuit blocks of the graphics system using data buses. Standard widths of data buses include 32 and 64 bits. Although nonstandard data buses may be used, nonstandard buses are typically more expensive and require additional development time. Primitive data words are typically 32 bits or less, except for the Z coordinate data, which may require 40 bits to achieve high precision.

In prior art graphics systems, a problem arises when it becomes necessary to pass the 40-bit Z coordinate data over a 32 bit wide data bus. It is desirable to transfer the Z coordinate data in only one bus cycle to maximize the transfer rate of the primitive data. In high end, or more expensive, prior art systems, the transfer of 40 bit Z coordinate data is achieved by utilizing custom data buses having bus widths of at least 40 bits. In low end prior art systems requiring less Z coordinate precision, the Z coordinate data is typically truncated to 32 bits to enable the use of standard data buses. Alternatively, in prior art systems using 32 bit data buses, each 40 bit Z coordinate word is transferred using more than one bus cycle, thereby lowering the graphics primitive data transfer rate. It is desirable to maintain the precision afforded by 40 bit Z coordinate data, while avoiding the necessity for two bus cycles to transfer the Z coordinate data.

SUMMARY OF THE INVENTION

According to one aspect of the present invention, apparatus is provided for transferring data between first and second circuit blocks of a computer graphics system. The first and second circuit blocks are interconnected by a data bus having n bits. The apparatus comprises a circuit in the first circuit block for sequentially transmitting data words from the first circuit block to the second circuit block on the data bus. The data words include one or more long data words having more than n bits. The apparatus further comprises a register in the first circuit block for storing bits of the long data words in excess of n bits, and a controller in the first circuit block, responsive to transmission of the long data words, for loading the bits of the long data words in excess of n bits into the register and for combining the bits of the long data words stored in the register into a composite data word for transmission to the second circuit block.

The composite data word may include a short data word having less than n bits. In a preferred embodiment, Z coordinate data words having 40 bits are transmitted on a 32 bit data bus. The 8 excess bits of three Z coordinate data words are combined with an 8 bit command word to form a 32 bit composite data word. Thus, no extra bus cycles are required to transmit the 40 bit Z coordinate data words.

According to another aspect of the present invention a method is provided for transferring data words between first and second circuit blocks of a computer graphics system. The first and second circuit blocks are interconnected by a data bus having n bits. The method includes the steps of transmitting n bits of each of the data words from the first circuit block to the second circuit block, the data words including one or more long data words having more than n bits, storing bits of the long data words in excess of n bits in a register, combining the bits of the long data words in excess of n bits to form a composite data word, and transmitting the composite data word from the first circuit block to the second circuit block on the data bus.

BRIEF DESCRIPTION OF THE DRAWINGS

For a better understanding of the present invention, reference is made to the accompanying drawings, which are incorporated herein by reference and in which:

FIG. 3 is a diagram of the graphics primitive data structure for a triangle primitive used in the embodiment of FIG. 2;

DETAILED DESCRIPTION

Figure 1:
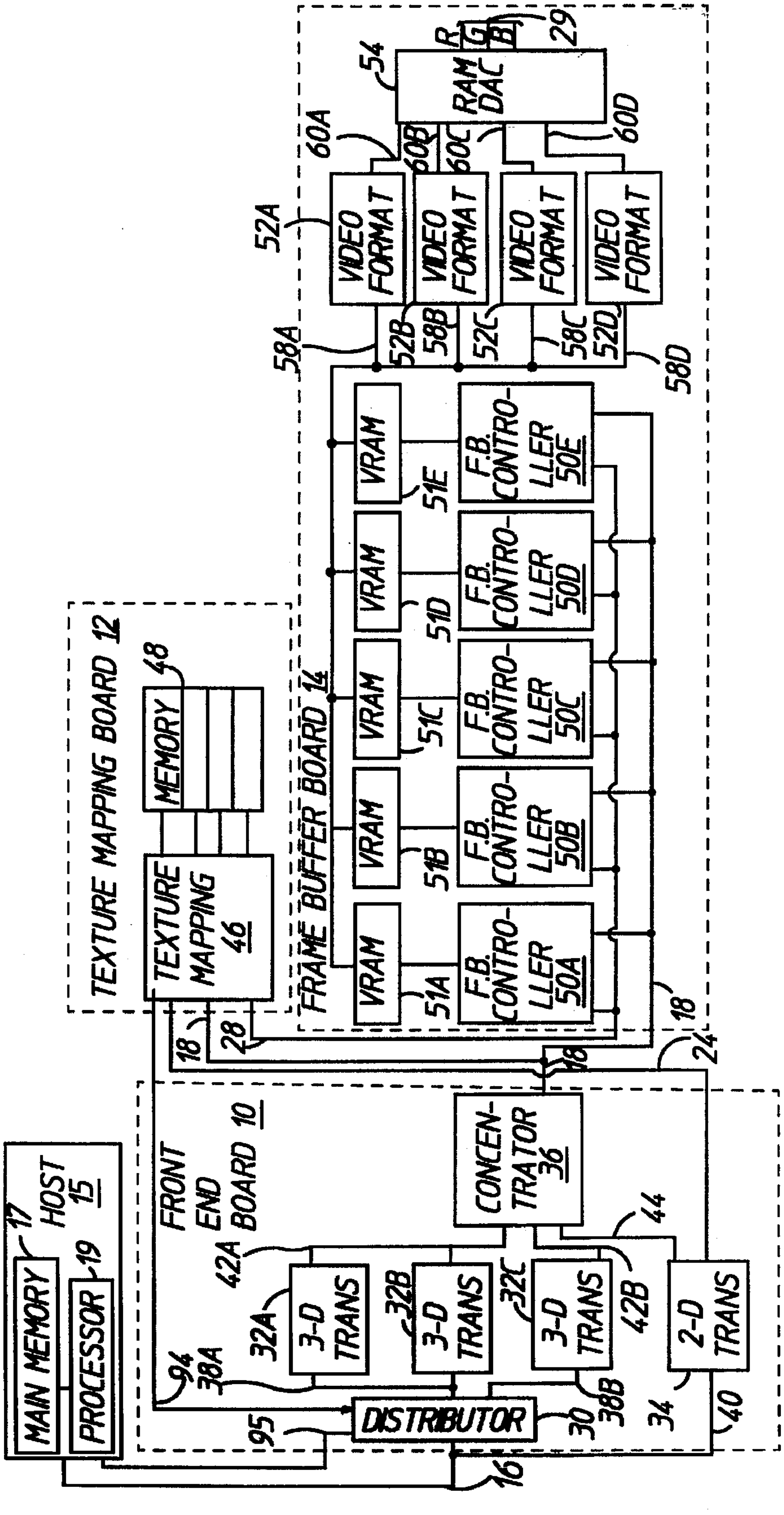
FIG. 1 is a block diagram of one embodiment of a computer graphics system suitable for incorporation of the present invention.
Figure 2:
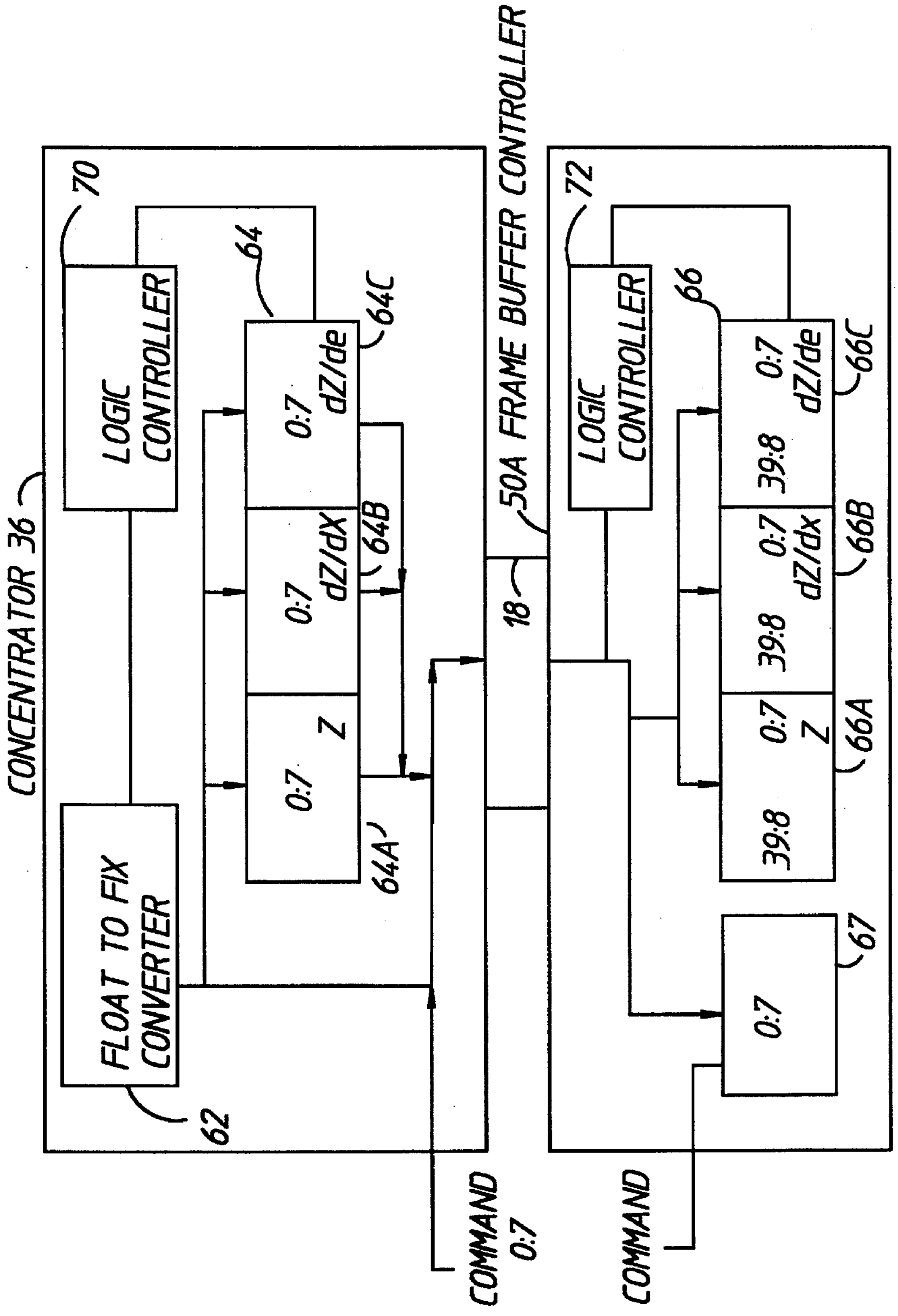
FIG. 2 is a block diagram of a first embodiment of the present invention.

FIG. 1 is a block diagram of one embodiment of a graphics system of the present invention that includes texture mapping hardware having a cache memory for storing texture data locally. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by x,y,z vector coordinate data, R,G,B color data and texture S,T coordinates, all for portions of the primitives, such as for the vertices when the primitive is a triangle. Data representing the primitives in three dimensions then is provided by the front end board 10 to the texture mapping board 12 and the frame buffer board 14 over 85-bit bus 18. The texture mapping board interpolates the primitive data received to compute the screen display pixels that will represent the primitive, and determines corresponding resultant texture data for each primitive pixel. The resultant texture data is provided to the frame buffer board over five 55-bit buses 28, which are shown in FIG. 2 as a single bus to clarify the figure.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 includes a distributor chip 30, three three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the x,y,z coordinates that define the primitives received into corresponding screen space coordinates, determines object R,G,B values and texture S,T values for the screen space coordinates, decomposes primitive quadrilaterals into triangles, and computes a triangle plane equation to define each triangle. Each 3-D geometry accelerator chip also performs view clipping operations to ensure an accurate screen display of the resulting image when multiple windows are displayed, or when a portion of a primitive extends beyond the view volume represented on the display screen. Output data from the 3-D geometry accelerator chips 32A and 32B, and 32C respectively is provided over 44-bit buses 42A and 42B to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment of the invention, the local memory is formed from a plurality of SDRAM (synchronous dynamic random access memory) chips for reasons discussed below. As described in greater detail below, the cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the primitives provided from the 3-D geometry accelerator chips 32A–C include points, lines and triangles. The texture mapping board does not perform texture mapping of points or lines, and operates only upon triangle primitives. The data representing the triangle primitives includes the x,y,z object pixel coordinates for at least one vertex, the object color R,G,B values of the at least one vertex, the coordinates in S,T of the portions of the texture map that correspond to the at least one vertex, and the plane equation of the triangle. The texture mapping chip 46 ignores the object pixel z coordinate and the object color R,G,B values. The chip 46 interpolates the x,y pixel coordinates and interpolates S and T coordinates that correspond to each x,y screen display pixel that represents the primitive. For each pixel, the texture mapping chip accesses the portion of the texture MIP map that corresponds thereto from the cache memory, and computes resultant texture data for the pixel, which may include a weighted average of multiple texels.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A–E are respectively coupled to groups of associated VRAM (video random access memory) chips 51A–E. The frame buffer board further includes four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen.

The manner in which the object and texture color values are combined can be controlled in a number of different ways. For example, in a replace mode, the object color values can be simply replaced by the texture color values, so that only the texture color values are used in rendering the pixel. Alternatively, in a modulate mode, the object and texture color values can be multiplied together to generate the final R,G,B values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller chips over bus 28 so that the controller chips can use the ratio specified by the corresponding resultant control word to determine the final R,G,B values for each pixel.

The resulting image video data generated by the frame buffer controller chips 50A–E, including R,G,B values for each pixel, is stored in the corresponding VRAM chips 51A–E. Each group of VRAM chips 51A–E includes eight VRAM chips, such that forty VRAM chips are located on the frame buffer board. Each of video format chips 52A–D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 27 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

FIG. 2 shows in greater detail relevant parts of bus 18, concentrator 36, and frame buffer controller 50A. The concentrator includes a floating point to fixed point converter 62, a logic controller 70, and a storage register 64 having 3 storage sections 64A, 64B, 64C, each having a storage capacity of at least 8 bits in the illustrative embodiment. The frame buffer controller 50A includes a logic controller 72, a storage register 67, and a storage register 66 having 3 storage sections 66A, 66B, and 66C, each having a storage capacity of at least 40 bits in the illustrative embodiment. The concentrator combines the primitive output data received from the 3-D geometry accelerator chips, provides a floating point to fixed point conversion in the floating point to fixed point converter 62, and provides the combined primitive output data over bus 18 to the frame buffer board.

The operation of the bus protocol according to a first embodiment of the present invention will now be described with reference to FIGS. 2–4 using a triangle primitive as an example. In one example, each triangle primitive is defined by 22 words of data. FIG. 3 is a diagram describing the 22 words used to define a triangle primitive. As shown in FIG. 3, each of the words that comprise the primitive data has 32 bits or less except for the three words of Z coordinate data, Z, dZ/dX, and dZ/de, each of which contains 40 bits of data.

In the embodiment shown in FIG. 2, the data bus is 32 bits wide to transfer words having 32 bits in one bus cycle. The 40 bit Z coordinate data cannot be transferred from the concentrator 36 to the frame buffer controller 50A in one 32 bit bus cycle. The procedure by which the 40 bit Z coordinate data words are transferred in the illustrative embodiment is shown in FIG. 4. In order to transfer the full 40 bits for each Z coordinate data word, the 32 most significant bits are transferred in one bus cycle and the remaining 8 bits are stored in storage register 64 under the control of the logic controller 70. This procedure is repeated for all three of the Z coordinate data words, resulting in 8 bits of each Z coordinate data word (24 bits) being stored in register 64. The logic controller 70 controls the shift register 64 such that eight bits from each of the Z coordinate data words Z, dZ/dX and dZ/de are stored in corresponding storage sections 64A, 64B, 64C, respectively, of the storage register.

The command word is typically the last word of the primitive data transferred over the data bus. In the embodiment shown in FIG. 2, the command word consists of only 8 bits. When the logic controller 70 detects that the command word is to be transferred, the 24 bits previously stored in storage register 64, consisting of bits 0 to 7 for each of the Z coordinate data words, are combined with the command word to form a composite word. The command word and the 8 low order bits for each of the Z data words (a total of 32 bits) are then transferred over the data bus in one bus cycle.

FIG. 2 also shows the relevant parts of the frame buffer board 50A. Each of the Z coordinate data words transferred over the data bus 18 is received by the frame buffer controller. As shown in FIG. 2, the 32 bits of each Z coordinate data word are stored under the control of logic controller 72 in the storage register 66 of the frame buffer controller as they are received. Then, when the bus cycle containing the command word is received by the frame buffer controller from the data bus and detected by the logic controller 72, the 8 bits corresponding to each of the Z coordinate data words are stripped off the composite word by the logic controller and placed in the storage register section corresponding to the appropriate Z coordinate word, such that each of the 40 bit Z coordinate data words is reassembled in the storage register 66. The command word is stored in the storage register 67.

Figure 4:
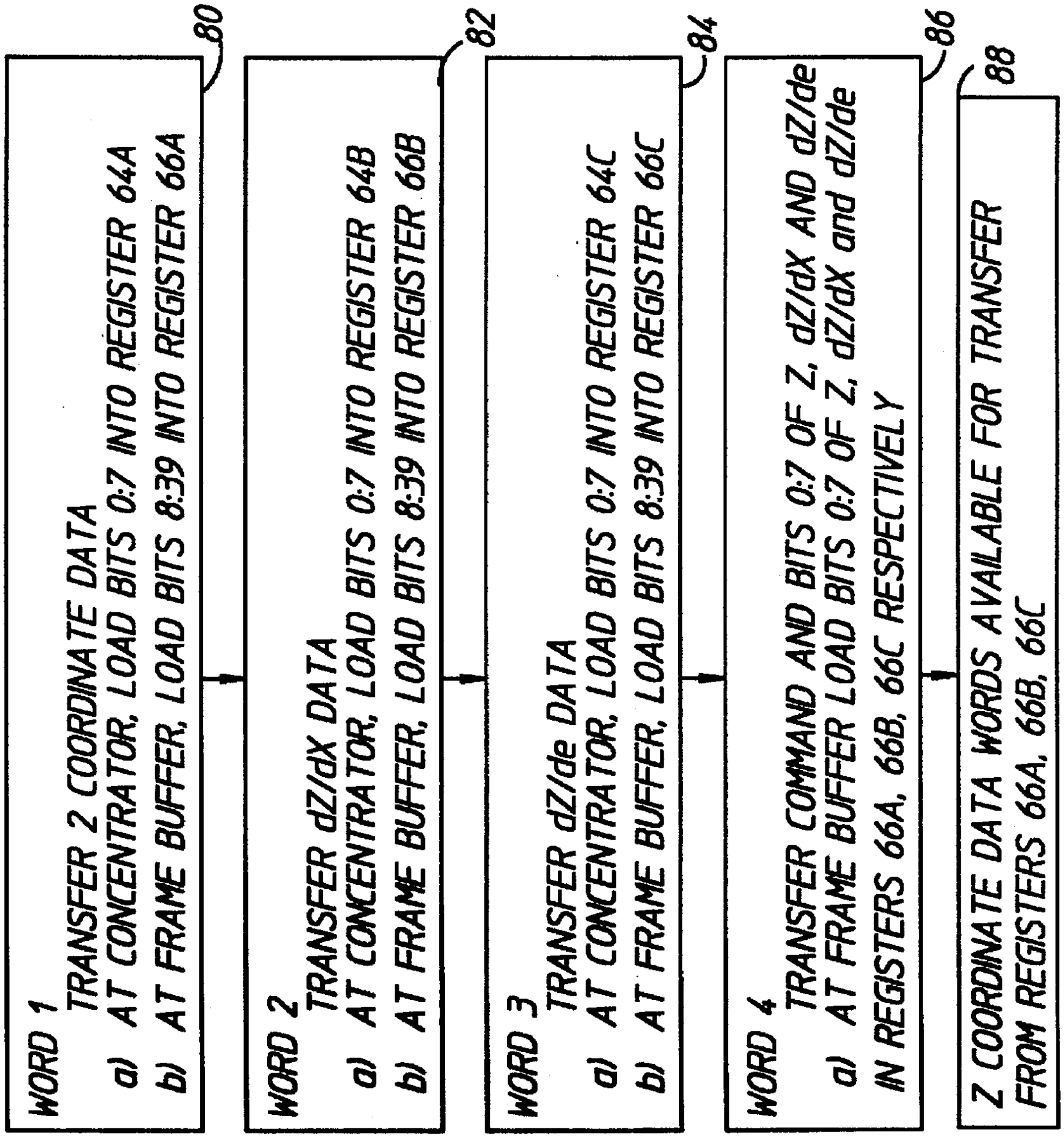
FIG. 4 is a diagram illustrating data flow in accordance with the embodiment of FIG. 2.

The transferring of Z coordinate data words in accordance with the protocol of the present invention is illustrated in the full diagram of FIG. 4. In step 80, 32 bits (bits 8: 39) of the Z coordinate data are transferred by the float to fix converter 62 to frame buffer controller 50A. The 32 bits of the Z coordinate data are loaded into register 66A under control of the logic controller 72. In the concentrator 36, bits 0:7 of the Z coordinate data word are loaded into register 64A. In step 82, bits 8:39 of the dZ/dX data word are transferred by the float to fix converter 62 over data bus 18 to the frame buffer controller 50A and are loaded into register 66B. Bits 0:7 of the dZ/dX data word are loaded into register 64B in concentrator 36. In step 84, bits 8:39 of the dZ/de data word are transferred by the float to fix converter 62 over data bus 18 and are loaded under control of logic controller 72 into register 66C. Bits 0:7 of the dZ/de data word are loaded into register 64C in concentrator 36. In step 86, 8 bits of the command word are combined with the contents of registers 64A, 64B and 64C to form a composite data word of 32 bits. The composite data word is transferred over data bus 18 to the frame buffer controller 50A. At the frame buffer controller 50A, bits 0:7 of each Z coordinate data word are loaded into the respective low order locations of register 66A, 66B and 66C. At this time (step 8A), the three Z coordinate data words are available for transfer from registers 66A, 66B and 66C. Three 40 bit Z coordinate data words as well as a command word have been transferred over the 32 bit data bus 18 in 4 bus cycles.

Under the scheme described above, the three 40 bit wide Z coordinate data words are transferred over a 32 bit wide data bus without requiring additional bus cycles to transfer all words comprising the primitive data for a triangle. In the embodiment described above, the 22 words that comprise the primitive data for a triangle are transferred in 22 bus cycles over a 32 bit wide data bus. In an exemplary implementation, the data bus 18 is 64 bits wide to transfer two 32 bit words in one bus cycle. In this implementation, the 22 words for a triangle primitive may be transferred in 11 bus cycles. However, because the two 32 bit words are separately controlled, the 64 bit bus is properly viewed as two 32 bit buses in parallel. for purposes of this discussion, the bus 18 is considered as having the capacity to transfer 32 bit data words.

Figure 5:
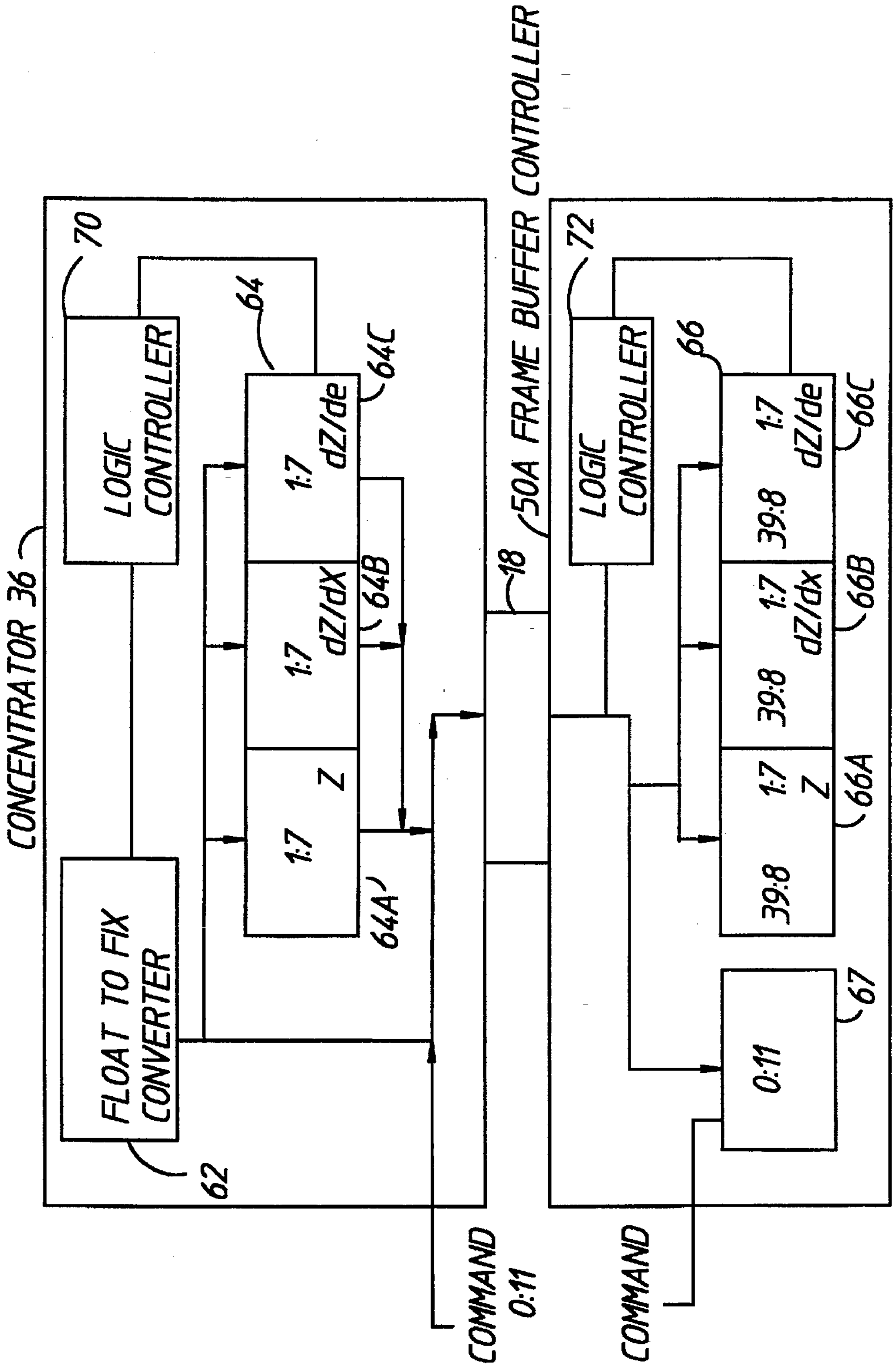
FIG. 5 is a block diagram illustrating the transfer of a command word and Z coordinate data in one bus cycle in accordance with a second embodiment of the present invention.

In a second embodiment of the present invention, the command word may have more than 8 bits, for example 11 bits. In this embodiment, only 7 bits of the remaining 8 data bits of each of the Z coordinate data words are transferred along with the command word. The 8th bit, corresponding to the least significant bit, of each of the Z coordinate data words is discarded. This embodiment of the present invention is shown in FIG. 5. As shown in FIG. 5, the storage register 66 in the frame buffer reassembles the Z coordinate data words. The embodiment of FIG. 5 operates in the same manner as the embodiment of FIGS. 2–4, with appropriate changes in the numbers of bits. In this embodiment, the reassembled Z coordinate data words will comprise only 39 of the original 40 bits. The loss of one bit for each Z coordinate data word results in some degradation of the Z precision. However, the resulting Z coordinate data words still contain more than 32 bits without requiring additional bus cycles.

It should be understood that this embodiment of the present invention can be applied to command words having a number of bits k other than 11. In this case, as many of the remaining Z coordinate data bits, contained in the storage register, as can be fit in a 32 bit data word along with the command word are transferred in one bus cycle, and any additional Z coordinate data bits, consisting of the least significant bits, are discarded.

Figure 6:
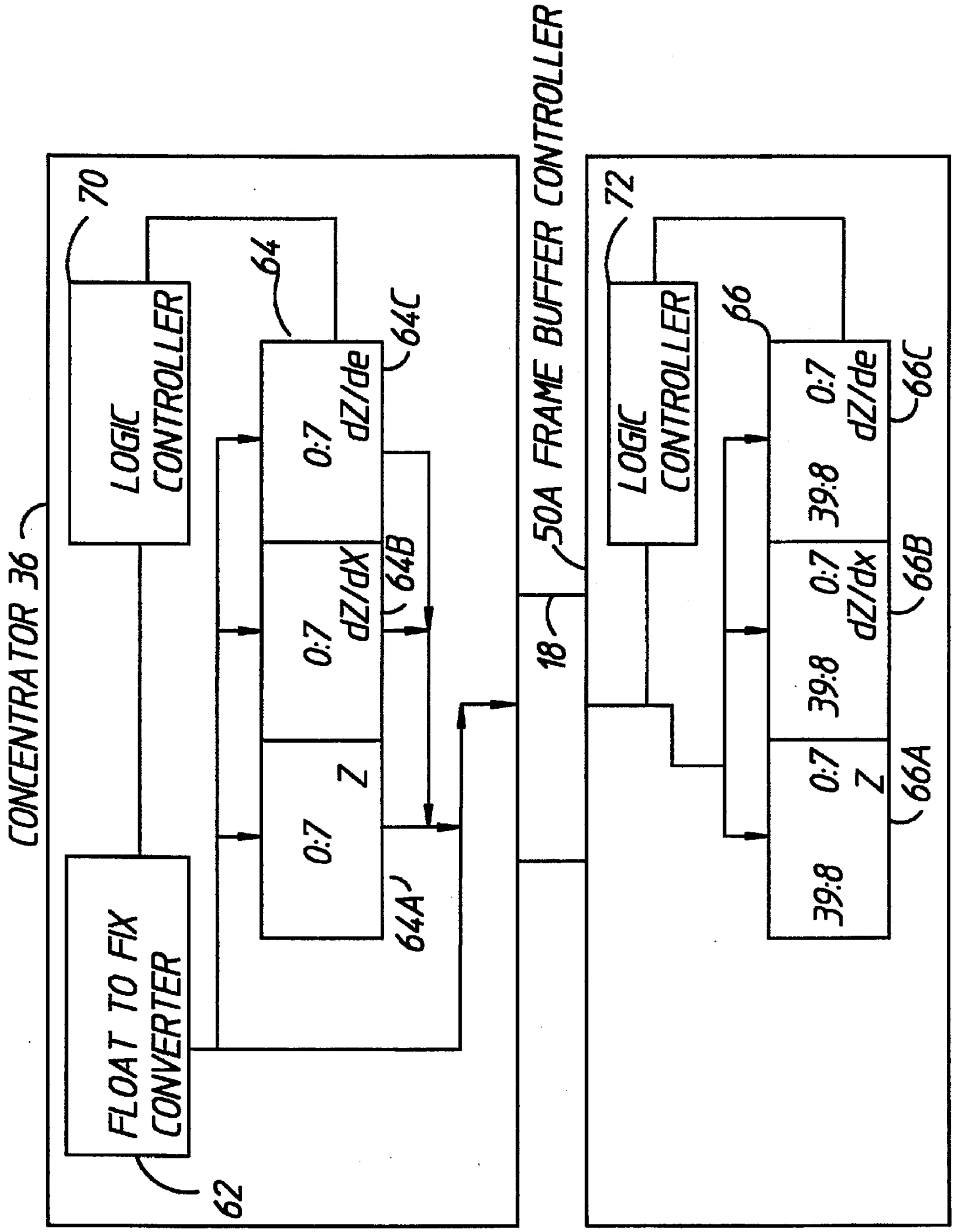
FIG. 6 is a block diagram illustrating the transfer of Z coordinate data when there is no command word in accordance with a third embodiment of the present invention.

In a third embodiment of the present invention, the primitive data does not include a command word. In this embodiment, illustrated in FIG. 6, the 24 remaining bits of the Z coordinate data words are transferred under the control of the logic controller 70 together in one additional bus cycle. As in the previous embodiments, 32 bits of each Z coordinate data word are transferred in one bus cycle, and the remaining 8 bits are stored in storage register 64, resulting in 24 bits being stored in storage register 64. The 32 bits of each Z coordinate data word, transferred over the data bus are received by the frame buffer board and are stored in storage register 66 by logic controller 72. The 24 bits stored in the storage register 64 are transferred over the data bus in one additional bus cycle. As the 24 bits are received by the frame buffer controller and detected by the logic controller 72, the 8 bits corresponding to each of the Z coordinate data words are placed in the storage register section corresponding to the appropriate Z coordinate data word, such that each of the 40 bit Z coordinate data words is reassembled in the storage register 66. This embodiment of the invention requires one additional bus cycle for each set of triangle primitive data.

Embodiments of the present invention have been described using a triangle primitive as an example. It should be understood that the present invention is similarly applicable for other graphics primitives, including points, lines, vectors and polygons. For these other primitives, the total number of words used to describe the primitive may vary, and the number of data words that exceed the bus width may be greater or less than three. However, the same overall scheme of the invention may be used. Specifically, bits of the Z coordinate data words in excess of the width of the data bus are combined with a word having less bits than the maximum capacity of the data bus, so that Z coordinate words having a greater number of bits than the data bus width are transferred without adding additional bus cycles.

Embodiments of the present invention have been described using a 32 bit wide data bus. It should be understood that the invention is applicable to data buses having widths of n bits, other than 32 bits, and to data words having any number m of bits (m>n). Also, the invention has been described for the case where the Z coordinate data comprises a greater number of bits than the width of the data bus. The scheme described above for transferring Z coordinate data is similarly applicable for transferring data words that represent any graphics parameters and have a greater number of bits than the bus width.

The circuitry shown and described herein is given by way of example only. The circuitry is preferably implemented in a large scale custom integrated circuit using logic synthesis software that is commercially available, for example, from Synopsys. The logic synthesis software optimizes and translates circuit descriptions written in high level languages, such as Veralog, into logic gates. The circuitry may be implemented using a CMOS process that produces 1 micron FET's which operate at 5 volts, a CMOS process that produces 0.6 micron drawn gate length devices which operate at 3.3 volts, or any other suitable process for implementing digital circuits. Since the input to the logic synthesis software is functional rather than structural, actual circuits generated by the logic synthesis software may differ from those disclosed herein.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. In a computer graphics system comprising first and second circuit blocks interconnected by a data bus having n bits, apparatus for transferring data between said circuit blocks, comprising:

a circuit in the first circuit block for sequentially transmitting data words from the first circuit block to the second circuit block on said data bus, said data words including a plurality of long data words having more than n bits;

a register in the first circuit block for storing bits of said long data words in excess of n bits; and a controller in the first circuit block, responsive to transmission of said long data words, for loading the bits of said long data words in excess of n bits into said register, and for combining the bits of said long data words stored in said register into a composite data word for transmission to said second circuit block, wherein the composite data word includes bits from two or more of the plurality, of long data words.

2. The apparatus of claim 1, further comprising a circuit in the second circuit block for reassembling said long data words.

3. The apparatus of claim 2, wherein the circuit in the second circuit block comprises a second register for reassembling each of said long data words and a second controller responsive to transmission of said long data words for loading said long data words into said second register and responsive to transmission of said composite data word for loading the bits of said long data words in excess of n bits from said composite data word into said second register, whereby said long data words are reassembled in said second register.

4. In a computer graphics system comprising first and second circuit blocks interconnected by a data bus having n bits, apparatus for transferring data between said circuit blocks, comprising:

a circuit in the first circuit block for sequentially transmitting data words from the first circuit block to the second circuit block on said data bus, said data words including one or more long data words having more than n bits;

a register in the first circuit block for storing bits of said long data words in excess of n bits;

a controller in the first circuit block, responsive to transmission of said long date words, for loading the bits of said long data words in excess of n bits into said register, and for combining the bits of said long data words stored in said register into a composite data word for transmission to said second circuit block;

a circuit in the second circuit block for reassembling said long data words; and wherein the data words further include a short data word having less than n bits, and wherein the controller is responsive to transmission of said short data words for combining the bits of said long data words stored in said register with said short data word to form the composite data word for transmission to said second circuit block.

5. The apparatus of claim 4, wherein the controller includes means for deleting a sufficient number of the low order bits of said long data words to reduce the number of bits of said composite data word to n bits.

6. The apparatus of claim 4, wherein: n is equal to 32; the plurality of long data words having greater than n bits are Z coordinate data words; and the short data word having less than n bits is a command word.

7. The apparatus of claim 6, wherein the Z coordinate data words have 40 bits and the command word has 8 bits.

8. In a computer graphics system comprising first and second circuit blocks interconnected by a data bus having n bits, apparatus for transferring data between said circuit blocks, comprising:

a circuit in the first circuit block for sequentially transmitting data words from the first circuit block to the second circuit block on said data bus, said data words including one or more long data words having more than n bits;

a register in the first circuit block for storing bits of said long data words in excess of n bits;

a controller in the first circuit block, responsive to transmission of said long data words, for loading the bits of said long data words in excess of n bits into said register, and for combining the bits of said long data words stored in said register into a composite data word for transmission to said second circuit block; and wherein the data words include a short data word having less than n bits, and wherein the controller is responsive to transmission of said short data words for combining the bits of said long data words stored in said register with said short data word to form the composite data word for transmission to said second circuit block.

9. The apparatus of claim 8, wherein the controller includes means for deleting a sufficient number of the bits of said long data words to reduce the number of bits of said composite data word to n bits.

10. In a computer graphics system comprising first and second circuit blocks interconnected by a data bus having n bits, apparatus for transferring data between said circuit blocks, comprising:

a circuit in the first circuit block for sequentially transmitting data words from the first circuit block to the second circuit block on said data bus, said data words including one or more long data words having more than n bits;

a register in the first circuit block for storing bits of said long data words in excess of n bits;

a controller in the first circuit block, responsive to transmission of said long data words, for loading the bits of said long data words in excess of n bits into said register, and for combining the bits of said long data words stored in said register into a composite data word for transmission to said second circuit block; and wherein the controller includes means for deleting a sufficient number of the bits of said long data words to reduce the number of bits of said composite data word to n bits.

11. In a computer graphics system comprising first and second circuit blocks interconnected by a data bus for transmitting data as words having n bits, a method of transferring data words over the data bus comprising the steps of:

transmitting n bits of each of the data words over the data bus from the first circuit block to the second circuit block, said data words including a plurality of long data words having more than n bits;

storing bits of the long data words in excess of n bits in a register;

combining the bits of the long data words in excess of n bits to form a composite data word having bits from at least two of the long data words; and transmitting the composite data word from the first circuit block to the second circuit block on the data bus.

12. The method of claim 11, further comprising the step of reassembling the long data words at the second circuit block.

13. The method of claim 12, wherein the step of reassembling the long data words at the second circuit block includes loading the long data words transmitted from the first circuit block to the second circuit block into a second register and loading the bits of the long data words in excess of n bits from said composite data word into said second register whereby the long data words are reassembled in said second register.

14. In a computer graphics system comprising first and second circuit blocks interconnected by a data bus for transmitting data as words having n bits, a method of transferring data words over the data bus comprising the steps of:

transmitting n bits of each of the data words over the data bus from the first circuit block to the second circuit block, said data words including one or more long data words having more than n bits;

storing bits of the long data words in excess of n bits in a register;

combining the bits of the long data words in excess of n bits to form a composite data word;

transmitting the composite data word from the first circuit block to the second circuit block on the data bus;

reassembling the long data words at the second circuit block; and wherein the data words further include a short data word having less than n bits and wherein the step of combining includes a step of combining the short data word with the bits of the long data words in excess of n bits to form the composite data word.

15. The method of claim 14, further comprising the step of deleting a sufficient number of bits of the long data words to reduce the number of bits of the composite data word to n bits.

16. In a computer graphics system comprising first and second circuit blocks interconnected by a data bus for transmitting data as words having n bits, a method of transferring data words over the data bus comprising the steps of:

transmitting n bits of each of the data words over the data bus from the first circuit block to the second circuit block, said data words including one or more long data words having more than n bits;

storing bits of the long data words in excess of n bits in a register;

combining the bits of the long data words in excess of n bits to form a composite data word;

transmitting the composite data word from the first circuit block to the second circuit block on the data bus; and wherein the data words further include a short data word having less than n bits and wherein the step of combining includes a step of combining the short data word with the bits of the long data words in excess of n bits to form the composite data word.

17. The method of claim 16, further comprising the step of deleting a sufficient number of bits of the long data words to reduce the number of bits of the composite data word to n bits.

18. In a computer graphics system comprising first and second circuit blocks interconnected by a data bus for transmitting data as words having n bits, a method of transferring data words over the data bus comprising the steps of:

transmitting n bits of each of the data words over the data bus from the first circuit block to the second circuit block, said data words including one or more long data words having more than n bits;

storing bits of the long data words in excess of n bits in a register;

combining the bits of the long data in excess of n bits to form a composite data word;

transmitting the composite data word from the first circuit block to the second circuit block on the data bus; and deleting a sufficient number of bits of the long data words to reduce the number of bits of the composite data word to n bits.

* * * * *